March 25, 1969     O. E. FREHOLM     3,434,570

DISK BRAKE APPARATUS

Filed May 15, 1967     Sheet _1_ of 2

INVENTOR.
OMAR E. FREHOLM
BY William R. Nolte
AGENT

INVENTOR.
OMAR E. FREHOLM
BY
William R. Nolte
AGENT

United States Patent Office 3,434,570
Patented Mar. 25, 1969

3,434,570
DISK BRAKE APPARATUS
Omar E. Freholm, Jenkintown, Pa., assignor to The Budd Company, Philadelphia, Pa., a corporation of Pennsylvania
Filed May 15, 1967, Ser. No. 638,246
Int. Cl. B61h 13/00; F16d 55/08, 63/00
U.S. Cl. 188—59                                      4 Claims

ABSTRACT OF THE DISCLOSURE

Disk brake apparatus for railway passenger cars including an air actuated cylinder for moving brake shoes into engagement with a rotating disk. An air piston cylinder is provided having a piston movable in a cylinder and including a plurality of strips of spring material each having one end formed into a coil and mounted on a freely rotating drum carried by the cylinder, and having the other end anchored to the piston. When air is released from the cylinder during a non-duty cycle of the brake, the plurality of strips continues to act upon the piston to cause the brake linings to lightly drag the rotating disk.

---

This invention relates to improved railway disk brake apparatus and more particularly, to automatically operated brake apparatus for applying brake shoe forces to a brake disk during the non-duty cycle of the apparatus.

During wet and under adverse winter weather conditions, the formation of a film of water or ice on a rotating brake disk precludes the best possible braking performance of the braking apparatus employed. These conditions have given rise to solutions calling for the incorporation of metallic particles in the brake linings in attempts to obtain better gripping action. In one such solution the piston of the air cylinder initially moves the brake shoes adjacent to the rotating disk to remove the film of water or ice and thereafter exerts a subsequent continuing motion to clamp the shoes into gripping engagement with the rotating disk to arrest its rotation. Upon release of the air in the cylinder the piston is restored to its initial starting position in which the brake shoes are spaced from the rotating disk thereby enabling subsequent buildup of film of water or ice.

By contrast other approaches to solve the problems of wet and iced friction surface operations have employed an automatic brake dragging principle in which a continuous light shoe force is maintained through the use of a high friction seal. In one such arrangement the friction seal grips the cylinder wall of the apparatus and normally urges the lining into engagement with the disks. The continuous shoe force that is desired after brake release is produced by the flexibility or rubber in the mechanical actuating system. Due to tracking problems of the wheels including lateral movement of the axles carrying the disks, and warpage or non-planar rotation of the brake disks, the friction ring when employed alone has been found unsatisfactory due to the fact that "knock back" forces tend to shift the friction ring relative to the cylinder wall of the actuating linkage so that the brake linings do not drag the disks.

It is the principal object of this invention therefore to provide an improved brake apparatus in which the brake shoes are maintained in continuous contact with the rotating disk and which avoids one or more of the disadvantages of the prior art arrangements.

It is another important object of this invention to provide an improved disk brake apparatus in which the brake linings thereof are maintained in uniform constant drag contact with the rotating disk and result in a single full piston stroke per shoe life of the apparatus.

For a better understanding of the invention together with other and further objects thereof, reference is had to the accompanying description taken in connection with the accompanying drawing and its scope will be pointed out in the appended claims.

In the drawing FIG. 1 is a top plan view of disk brake apparatus embodying the invention;

Figure 1:
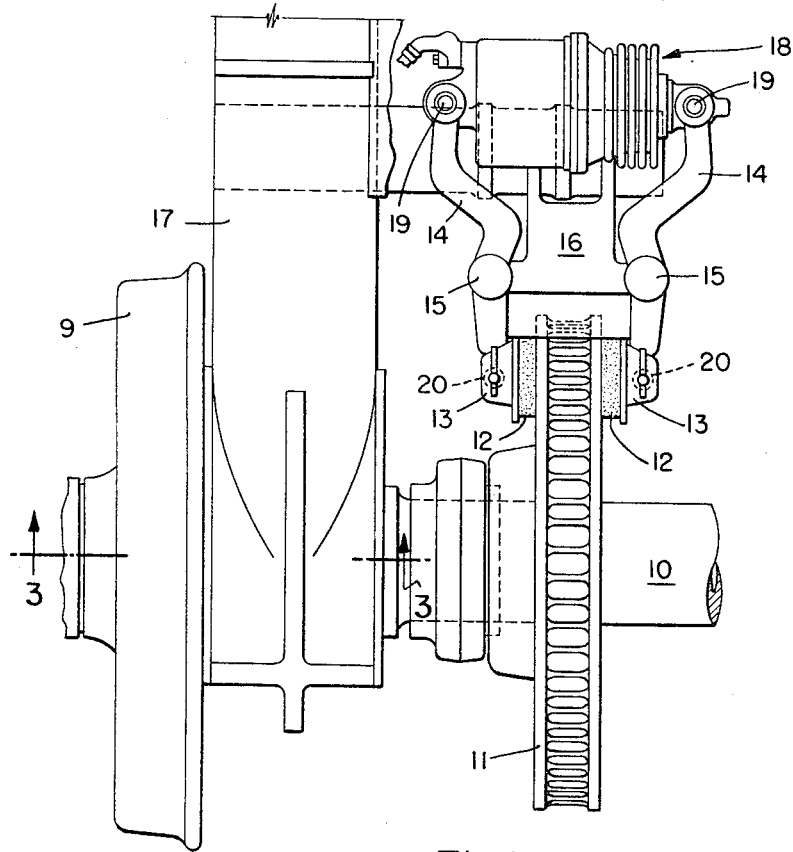
Figure 3:
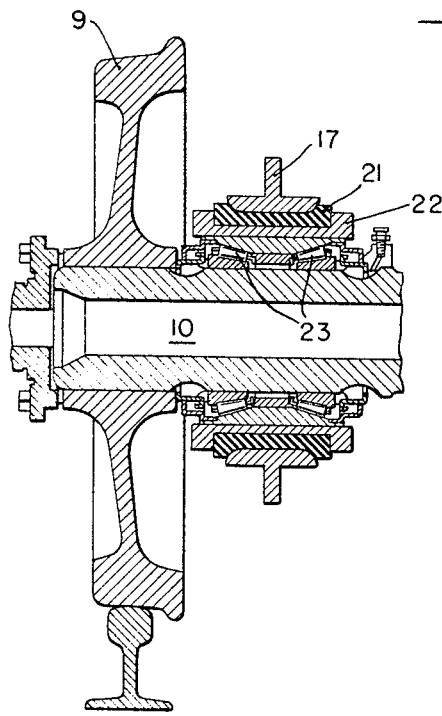
FIG. 3 is a sectional view taken along the line 3—3 of FIG. 1.

Referring now to the general arrangement of the apparatus as seen in FIG. 1, there is shown a truck wheel axle unit for a railway passenger vehicle having a wheel 9, with a brake disk 11, secured fast on the axle 10. Brake shoe lining pads 12 mounted in and carried by brake shoes 13 are provided for acting against opposite surfaces of the disk. Brake operating levers or tongs 14 are pivoted at 15 on a mount 16 carried by a truck side frame 17 of the truck. The brake shoes 13 are pivoted to the inner ends of tongs 14 by means of pivot pins 20. A brake operating motor or air cylinder assembly 18 is carried by the outer extremities of tongs 14 by pivot pins 19. As seen in FIG. 3, axle 10 may be mounted for slight universal movement within a joint of truck frame 17 by the provision of an elastic resilient layer 21 of rubber-like material such as neoprene which is disposed between a tubular bearing retainer housing 22, carrying bearings 23, and the side frame of the truck.

Figure 2:
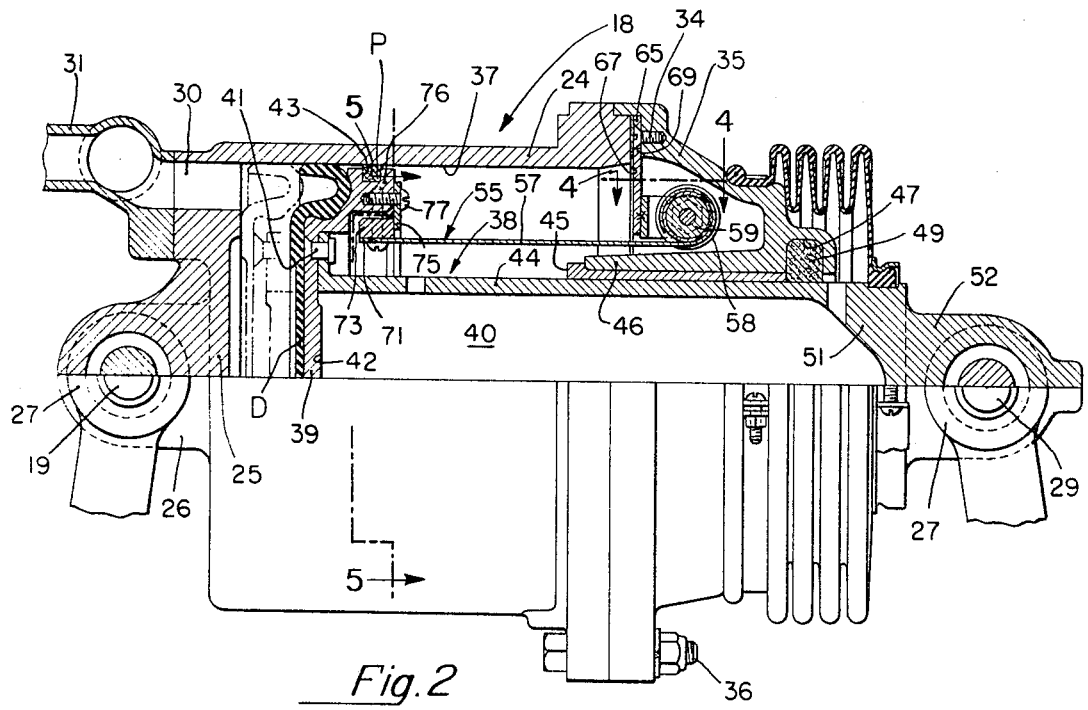
FIG. 2 is an enlarged partial plan and axial sectional view of the brake air cylinder shown in FIG. 1.
Figure 5:
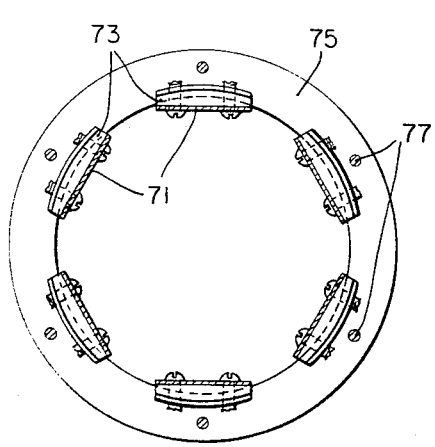
FIG. 5 is a partial sectional view taken along the line 5—5 of FIG. 2.
Figure 4:
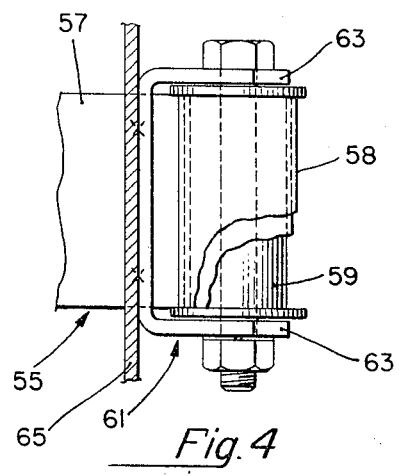
FIG. 4 is a partial sectional view taken along the line 4—4 of FIG. 2.

In accordance with the present invention as particularly shown in FIG. 2, the motor unit 18 includes a cylinder 24 having a head end or bottom wall 25 with a boss portion 26 which receives bushing 27 to accommodate the aforementioned pivot 19. The bottom wall also defines an aperture 30 to receive air hose 31 connected with a suitable supply of air under pressure. A cover 35 engages the opposite end of the cylinder 24 and is secured thereon by suitable bolts as at 36. The cylinder 24 defines an interior chamber 37 within which rides piston-sleeve means 38. The latter consists of an annular piston head 39, and an elongated sleeve 40 constituting a rod which is secured as by rivets 41 to the inner face 42 of the piston 39. A lubricator swab P can be received within an annular groove 43 of piston head 39 to lubricate the inner face of chamber 37. A packing cup D coacts with the other face of piston 39 and chamber 37. The outer cylindrical surface 44 of the hollow sleeve 40 rides in a suitable bronze bushing 45 pressed in an inturned elongated sleeve-like portion 46 defining an opening within cover 35. The cover 35 also defines an annular recess 47 adjacent to the sleeve like portion to receive a felt ring 49 which may be suitably oiled to lubricate the outer surface 44 of the sleeve to facilitate its movement in bearing sleeve 45. The end opposite piston 39 of piston sleeve 40 defines a head or closed end 51 which includers a boss portion 52 defining a suitable aperture to receive the aforementioned bushing 27 and pivot 29.

In order to keep a constant force loading of the brake linings on the rotating disk, the air cylinder 18 is provided with a plurality of constant force spring means 55 aligned axially relative to hollow sleeve 40 of piston head 39. In accordance with the present invention each spring means includes a flat strip 57 of prestressed metal. For purposes of clarity of illustration only one strip is shown in FIG. 2. One end 58 of the strip is formed into a tight coil and mounted on a freely rotating reel 59 which is received within arms 63 of U-shaped bracket 61. Each bracket is suitably secured as by welding to reel retainer ring plate 65. The ring plate is disposed in a plane normal to the axis of the piston 39 with its periphery being gripped between the terminating edge 67 of cylinder 24 and the mating marginal edge 69 of cover 35. Prior to assembly of the cover 35 to the cylinder 24, the ring plate 65 is secured to the cover by screws 34. The opposite end 71 of spring strip 57 is suitably anchored to block 73 which in turn is integrally joined to ring plate 75. The aforementioned piston head 39 includes a raised peripheral rim portion 76 to enable securement of the outer marginal edge of the ring plate 75 thereto as by screws 77.

When so installed within the air cylinder 18 the plurality of flat prestressed coiled springs 55 are effective to move the piston head 39 away from the head end 25 of cylinder 24. This movement causes the lining tongs 14 to urge the brake linings 12 into slight pressure engagement with opposite faces of the brake disk 11. Thereafter upon application of air to the cylinder during successive duty cycles, the air so applied exerts an additional force on the piston 39, in the sace direction as that applied by the flat springs, to cause the linings 12 to grip the disk 11 with a greater force and of a magnitude to arrest its rotation. Upon release of air from the cylinder 18 however, the spring means 55 anchored at their one ends by means of the reel retainer ring plate 65 secured to the cylinder casing 24, continue to exert a force to the rim 77 of piston head 39 through ring 75. Thus irrespective of any "knock back" forces due non-planar rotation of rotating disk 11 on axle 10, or any lateral movement of the disk 11, the spring means are capable of exerting a constant uniform drag force of the linings 12 on the disk 11.

It should be further noted that a piston return spring is eliminated in that it is not necessary that the primary piston 39 be returned into facing engagement with the head end 25 of the primary cylinder chamber 24. Thus the piston 39 undergoes or travels only a single full piston stroke during the life of the brake shoe linings and the springs exert a constant force on the piston and linings irrespective of the position of the piston.

While there has been described what at present is considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. Brake apparatus for applying continuous drag forces to a rotating disk, comprising in combination, cylinder means having a chamber head end and a first power connection, piston means movable within said cylinder means and having a second power connection in opposed relationship to said first power connection, air supply means for applying air to said cylinder means to move said piston means in one direction and for releasing air from said cylinder means, and spring tensioning means connected to said cylinder means and said piston means for urging the last named means in said one direction, said spring means including an extensible flat strip of prestressed spring material formed into a wrapped coil portion at one of its ends for exerting a constant force throughout its extension.

2. Apparatus as set forth in claim 1 wherein said wrapped coil portion is connected to a freely rotating reel and wherein mounting means are provided for said rotating reel.

3. In the apparatus as set forth in claim 2 wherein said mounting means include plate means secured to said cylinder means and wherein bracket means are secured on said plate means to receive said reel means for rotation relative thereto.

4. In the apparatus as set forth in claim 3 wherein additional means including a plate with mounting lugs thereon is provided for connecting the other end of each said flat strip of prestressed material to said piston head.

References Cited

UNITED STATES PATENTS

| 2,764,265 | 9/1956 | Runner | 188—83 X |
| 2,942,697 | 6/1960 | Polanin | 188—59 X |
| 3,181,654 | 5/1965 | Peras | 188—73 |
| 3,285,370 | 11/1966 | Swift | 188—73 |

DUANE A. REGER, *Primary Examiner.*

U.S. Cl. X.R.

188—73, 83